(12) United States Patent
Pinnegar et al.

(10) Patent No.: US 7,617,053 B2
(45) Date of Patent: Nov. 10, 2009

(54) PROCESSING OF SEISMIC DATA USING THE S-TRANSFORM

(75) Inventors: C. Robert Pinnegar, Calgary (CA); Robert J. McGrory, Calgary (CA); Robert R. Stewart, Calgary (CA)

(73) Assignee: Calgary Scientific Inc., Calgary, Alberta (CA)

( * ) Notice: Subject to any disclaimer, the term of this patent is extended or adjusted under 35 U.S.C. 154(b) by 174 days.

(21) Appl. No.: 11/798,371

(22) Filed: May 14, 2007

(65) Prior Publication Data

US 2007/0299613 A1 Dec. 27, 2007

Related U.S. Application Data

(60) Provisional application No. 60/799,649, filed on May 12, 2006.

(51) Int. Cl.
*G06F 3/14* (2006.01)
(52) U.S. Cl. .............................. 702/18; 702/14; 367/7; 367/9; 367/14
(58) Field of Classification Search .................. 702/14, 702/18; 367/7, 9, 14
See application file for complete search history.

(56) References Cited

U.S. PATENT DOCUMENTS

| | | | | |
|---|---|---|---|---|
| 5,940,778 A * | 8/1999 | Marfurt et al. | ................. | 702/16 |
| 6,253,157 B1 * | 6/2001 | Krebs | ........................... | 702/18 |
| 6,278,949 B1 * | 8/2001 | Alam | .......................... | 702/16 |

* cited by examiner

*Primary Examiner*—Drew A Dunn
*Assistant Examiner*—Hien X Vo
(74) *Attorney, Agent, or Firm*—Freedman & Associates

(57) ABSTRACT

The present invention relates to a method and system for processing seismic data. Seismic data indicative of at least a time-dependent seismic trace are transformed into time-frequency domain using the S-transform. The transformed seismic data are processed for determining at predetermined time instances an instantaneous amplitude and a dominant instantaneous frequency. Based on a quotient of the instantaneous amplitude to the dominant instantaneous frequency seismic data indicative of a likelihood of a presence of hydrocarbons are then determined which are then graphically displayed. The method and system for processing seismic data provides a powerful tool for determining the likelihood of a presence of hydrocarbons based on a double peak hydrocarbon signature in the quotient of the instantaneous amplitude to the dominant instantaneous frequency.

26 Claims, 13 Drawing Sheets

PROCESSING OF SEISMIC DATA USING THE S-TRANSFORM

This application claims the benefit of U.S. Provisional Application No. 60/799,649, filed on May 12, 2006, the entire contents of which are incorporated herein by reference.

FIELD OF THE INVENTION

This invention relates to processing of seismic data and in particular to a processing method and system for processing of seismic data using the S-transform.

BACKGROUND OF THE INVENTION

Exploration seismology is widely used for detecting oil and gas deposits. Seismic waves emitted at predetermined locations on a surface or in a surface layer using, for example, explosives propagate downwards into the ground. When the seismic waves encounter a boundary between different geological layers, a portion of the seismic waves is reflected back to the surface which is detected using a pre-deployed array of sensors—geophones. The non-reflected portion of the seismic waves is transmitted further downwards where it is reflected off deeper boundaries and subsequently recorded at the surface at later time instances enabling detection of multiple geological layers. The output signals of the geophones are then processed producing seismic data called "migrated sections".

The characteristics of seismic reflections from layer boundaries are determined by geometric and acoustic properties of the layers, with the acoustic properties being expressed in terms of seismic impedances—product of layer density with propagation velocity of the seismic waves through the respective layer. The amplitude of a reflected seismic wave depends upon the amount of difference between the seismic impedances of two adjacent layers, while its polarity depends upon whether the reflected seismic wave is traveling from a layer of higher impedance to a layer of lower impedance, or vice versa. Hydrocarbon bearing layers are likely porous, lowering their density. Also, the hydrocarbons disposed therein transmit seismic waves less efficiently and, therefore, more slowly than non-porous and non-permeable materials. Both of these effects lower the seismic impedance and, therefore, hydrocarbon deposits are usually associated with enhanced impedance contrasts. As a result, seismic waves reflected from hydrocarbon bearing layers are different from seismic waves reflected from surrounding layers. However, lateral changes in reflectivity do not directly imply the presence of hydrocarbons.

Another property of the hydrocarbon bearing layers is their compressibility. Natural gas is highly compressible and oil, which typically contains natural gas dissolved therein is, to some extent, also compressible. This leads to relatively large frictional amplitude losses of seismic waves passing therethrough. For this reason, layers of this type are often described as having low "quality." On the other hand, porous layers where hydrocarbons have been replaced by ground water cause smaller amplitude losses, since water is substantially incompressible. Therefore, seismic waves propagate further through such layers, which are then considered to have higher "quality."

Quality is useful in hydrocarbon exploration because it is closely related to the compressibility, but, unlike the compressibility, it is an observable seismic attribute. The quality factor—or Q factor—quantifies the rate of amplitude decline via:

$$A_f(t) = A_f(0) \exp\left(\frac{-\pi f t}{Q}\right), \quad (1)$$

where $A_f(t)$ denotes the local amplitude of the $f^{th}$ frequency at time t. According to this definition Q gives the amount of amplitude loss per wave cycle, indicating that seismic waves of shorter wavelength—i.e. higher frequencies—decline faster than seismic waves having longer wavelengths.

Amplitude, frequency, and Q factor have been extensively investigated and used in the past as separate seismic attributes. Recently, a new method for evaluating migrated sections has been developed in which all three effects are combined in a single seismic attribute, referred to informally as the "sweetness factor," which has been found to be highly beneficial in exploration seismology. The sweetness factor is defined as the quotient of instantaneous amplitude to instantaneous frequency of a seismic trace. At present, the instantaneous amplitude and the instantaneous frequency are determined based on the Hilbert transform. Unfortunately, this method does not provide physically meaningful results in situations where the seismic trace contains events that overlap in time but have different frequencies. Such situations are frequently encountered in exploration seismology.

It would be highly desirable to overcome the above problem of the state of the art and to provide an improved method capable of determining a sweetness factor in situations when the seismic data contain events that overlap in time but have different frequencies.

SUMMARY OF THE INVENTION

It is, therefore, an object of embodiments of the invention to provide a method and system for processing seismic data capable of determining a sweetness factor in situations when the seismic data contain events that overlap in time but have different frequencies.

It is further an object of embodiments of the invention to provide a method and system for processing seismic data capable of determining a dominant instantaneous frequency for calculating the sweetness factor.

In accordance with the present invention there is provided a method for processing seismic data comprising:

receiving the seismic data, the seismic data being indicative of at least a time-dependent seismic trace;

determining second seismic data by transforming the seismic data into time-frequency domain using a time-frequency transform;

processing the second seismic data for determining at predetermined time instances an instantaneous amplitude and a dominant instantaneous frequency;

determining at the predetermined time instances third seismic data indicative of a likelihood of a presence of hydrocarbons based on a quotient of the instantaneous amplitude to the dominant instantaneous frequency; and, providing the third seismic data.

In accordance with another embodiment of the present invention there is provided a method for processing seismic data comprising:

receiving the seismic data, the seismic data being indicative of a plurality of time-dependent seismic traces of one of a two-dimensional migrated section and a three-dimensional migrated section;

determining second seismic data by transforming each of the plurality of seismic traces into time-frequency domain using a S-transform;

processing the second seismic data for averaging a modulus of the S-transform of seismic traces corresponding to at least a predetermined portion of the one of a two-dimensional migrated section and a three-dimensional migrated section;

determining at each of a plurality of predetermined time instances a maximum amplitude of the averaged modulus of the S-transform and associating the instantaneous amplitude therewith;

determining at each of the plurality of predetermined time instances the dominant instantaneous frequency as the frequency where the maximum amplitude of the averaged modulus of the S-transform occurs;

determining at each of the plurality of predetermined time instances third seismic data indicative of a likelihood of a presence of hydrocarbons based on a quotient of the instantaneous amplitude to the dominant instantaneous frequency; and, providing the third seismic data.

In accordance with another embodiment of the present invention there is provided a method for processing seismic data comprising:

receiving the seismic data, the seismic data being indicative of at least a time-dependent seismic trace;

determining second seismic data by transforming the seismic data into time-frequency domain using a time-frequency transform;

processing the second seismic data for determining at predetermined time instances an instantaneous amplitude and a dominant instantaneous frequency;

determining at the predetermined time instances third seismic data indicative of a likelihood of a presence of hydrocarbons based on a quotient of the instantaneous amplitude to the dominant instantaneous frequency;

providing the third seismic data;

processing the third seismic data for detecting first occurrences where the quotient of the instantaneous amplitude to the dominant instantaneous frequency is above a predetermined first threshold;

processing the third seismic data of seismic traces where first occurrences have been detected for detecting second occurrences where the quotient of the instantaneous amplitude to the dominant instantaneous frequency is above a predetermined second threshold;

determining fourth seismic data indicative of seismic traces comprising the first and the second occurrences; and, providing the fourth seismic data.

In accordance with another aspect of the present invention there is further provided a storage medium having stored therein executable commands for execution on a processor, the processor when executing the commands performing:

receiving the seismic data, the seismic data being indicative of at least a time-dependent seismic trace;

determining second seismic data by transforming the seismic data into time-frequency domain using a time-frequency transform;

processing the second seismic data for determining at predetermined time instances an instantaneous amplitude and a dominant instantaneous frequency;

determining at the predetermined time instances third seismic data indicative of a likelihood of a presence of hydrocarbons based on a quotient of the instantaneous amplitude to the dominant instantaneous frequency; and, providing the third seismic data.

In accordance with another embodiment of the present invention there is yet further provided a storage medium having stored therein executable commands for execution on a processor, the processor when executing the commands performing:

receiving the seismic data, the seismic data being indicative of a plurality of time-dependent seismic traces of one of a two-dimensional migrated section and a three-dimensional migrated section;

determining second seismic data by transforming each of the plurality of seismic traces into time-frequency domain using a S-transform;

processing the second seismic data for averaging a modulus of the S-transform of seismic traces corresponding to at least a predetermined portion of the one of a two-dimensional migrated section and a three-dimensional migrated section;

determining at each of a plurality of predetermined time instances a maximum amplitude of the averaged modulus of the S-transform and associating the instantaneous amplitude therewith;

determining at each of the plurality of predetermined time instances the dominant instantaneous frequency as the frequency where the maximum amplitude of the averaged modulus of the S-transform occurs;

determining at each of the plurality of predetermined time instances third seismic data indicative of a likelihood of a presence of hydrocarbons based on a quotient of the instantaneous amplitude to the dominant instantaneous frequency; and, providing the third seismic data.

In accordance with yet another aspect of the present invention there is yet further provided a system for processing seismic data comprising:

an input port for receiving the seismic data, the seismic data being indicative of at least a time-dependent seismic trace;

a processor in communication with the input port for:
  a) determining second seismic data by transforming the seismic data into time-frequency domain using a time-frequency transform;
  b) processing the second seismic data for determining at predetermined time instances an instantaneous amplitude and a dominant instantaneous frequency;
  c) determining at the predetermined time instances third seismic data indicative of a likelihood of a presence of hydrocarbons based on a quotient of the instantaneous amplitude to the dominant instantaneous frequency; and, a storage medium in communication with the processor having stored therein executable commands for execution on the processor, the processor when executing the commands performing at least a portion of a) to c); and, an output port in communication with the processor for providing the third seismic data.

In accordance with another embodiment of the present invention there is yet further provided a system for processing seismic data comprising:

an input port for receiving the seismic data, the seismic data being indicative of a plurality of time-dependent seismic traces of one of a two-dimensional migrated section and a three-dimensional migrated section;

a processor in communication with the input port for:
  a) determining second seismic data by transforming each of the plurality of seismic traces into time-frequency domain using a S-transform;
  b) processing the second seismic data for averaging a modulus of the S-transform of seismic traces corresponding to at least a predetermined portion of the one of a two-dimensional migrated section and a three-dimensional migrated section;
  c) determining at each of a plurality of predetermined time instances a maximum amplitude of the averaged modulus of the S-transform and associating the instantaneous amplitude therewith;
  d) determining at each of the plurality of predetermined time instances the dominant instantaneous frequency as the frequency where the maximum amplitude of the averaged modulus of the S-transform occurs;
  e) determining at each of the plurality of predetermined time instances third seismic data indicative of a likelihood of a presence of hydrocarbons based on a quotient of the instantaneous amplitude to the dominant instantaneous frequency; and, a storage medium in communication with the processor having stored therein executable commands for execution on the processor, the processor when executing the commands performing at least a portion of a) to e); and, an output port in communication with the processor for providing the third seismic data.

BRIEF DESCRIPTION OF THE FIGURES

Exemplary embodiments of the invention will now be described in conjunction with the following drawings, in which.

DETAILED DESCRIPTION OF THE INVENTION

Figure 1A:
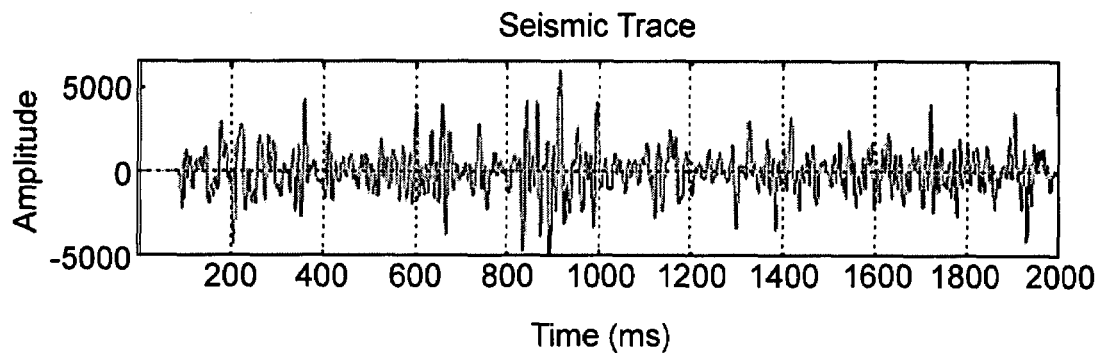
FIGS. 1a to 1c are diagrams illustrating a seismic trace, its instantaneous amplitude, and its instantaneous frequency determined based on the Hilbert transform.

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

The Sweetness Factor (SF) is defined as the quotient of the two seismic attributes—the instantaneous amplitude and the instantaneous frequency. Therefore, before calculating the sweetness factor, the instantaneous amplitude and the instantaneous frequency of a seismic trace h(t) are determined at predetermined time instances t. For the sake of clarity and to provide a better understanding of the invention, the state of the art method based on the Hilbert transform and its drawbacks will be described in the following. Suppose for the moment that the seismic trace h(t) is a continuous function of time, and that it is defined as:

$$h(t) = A(t)\cos\{2\pi\phi(t)\}, \quad (2)$$

where A(t) is the instantaneous amplitude, and $\phi(t)$ is the instantaneous phase, from which the instantaneous frequency F(t) is obtained via:

$$F(t) \frac{d\phi(t)}{dt}. \quad (3)$$

Equations (2) and (3) provide the definition of the seismic trace h(t) in terms of its instantaneous amplitude and its instantaneous frequency. When the seismic trace h(t) is sampled in time to obtain a discrete function h[t], the following discrete forms of equations (2) and (3) are obtained:

$$h[t] = A[t]\cos\{2\pi\phi[t]\}, \quad (4a)$$

$$F[t] = \frac{\phi[t+1] - \phi[t]}{T}, \quad (4b)$$

where T is the sampling interval. In equation (4b) the definition of the instantaneous frequency F[t] is in terms of a forward difference operator. In equation (4a), the instantaneous amplitude A[t] and the instantaneous phase $\phi[t]$ are not uniquely defined, because there is one function of t on the left-hand side of the equation but two functions of t on its right-hand side. Nonetheless, the concept of instantaneous amplitude and instantaneous frequency is still useful, because it allows to explain that the signal always has a positive instantaneous amplitude A[t], and that negative signal amplitudes are due to the presence of the cosine term. The instantaneous amplitude A[t] and the instantaneous phase φ[t] are then defined using the analytic signal $\tilde{h}[t]$ of the seismic trace h[t] obtained as:

$$\tilde{h}[t] = \frac{1}{N} \sum_{f=-\text{floor}(N/2)}^{\text{ceil}(N/2)-1} S[f]H[f]\exp\left(\frac{2\pi i ft}{N}\right), \quad (5)$$

where f is frequency, N is the number of points in h, and "ceil" and "floor" denote upwards and downwards rounding operations that are used when N is an odd number. The function H[f] is the Discrete Fourier Transform (DFT) of h[t] defined by:

$$H[f] = \sum_{t=0}^{N-1} h[t]\exp\left(\frac{-2\pi i ft}{N}\right), \quad (6)$$

and S[f] is a step function:

$$S[f] = 1, \; f = 0; \quad (7)$$
$$= 2, \; 0 < f < N/2;$$
$$= 1, \; f = \pm N/2;$$
$$= 0, \text{ otherwise.}$$

If h[t]=cos(2πf$_0$t/N) with f$_0$ being a nonzero integer frequency index, then $$\tilde{h}[t] = \exp(2\pi i f_0 t/N), \quad (8)$$
$$= \cos(2\pi f_0 t/N) + i\sin(2\pi f_0 t/N).$$

The imaginary part of $\tilde{h}[t]$ is referred to as the Hilbert transform of h[t], which in equation (8) is identical to h[t] after a π/2-radian phase shift, while the real part of $\tilde{h}[t]$ is h[t] itself. Comparing equation (8) with the notation introduced in equations (2) and (3), A[t]=1 and F[t]=f$_0$ is obtained, which is true for a monotonic cosine.

Similarly, the analytic signal of h[t]=sin(2πf$_0$t/N) gives $$\tilde{h}[t] = \sin(2\pi f_0 t/N) - i\cos(2\pi f_0 t/N), \quad (9)$$

again showing an imaginary part that is equal to h[t] after a π/2-radian phase shift, and a real part that is equal to h[t]. Once again, A[t]=1 and F[t]=f$_0$. Since equations (8) and (9) are true for any value of f$_0$, and since, according to Fourier's theory, all signals are a superposition of sines and cosines it is assumed that an arbitrary signal h[t] results in an analytic signal $\tilde{h}[t]$ whose real part is equal to h[t], and whose imaginary part resembles h[t] but with a π/2-radian phase shift.

Figure 1B:
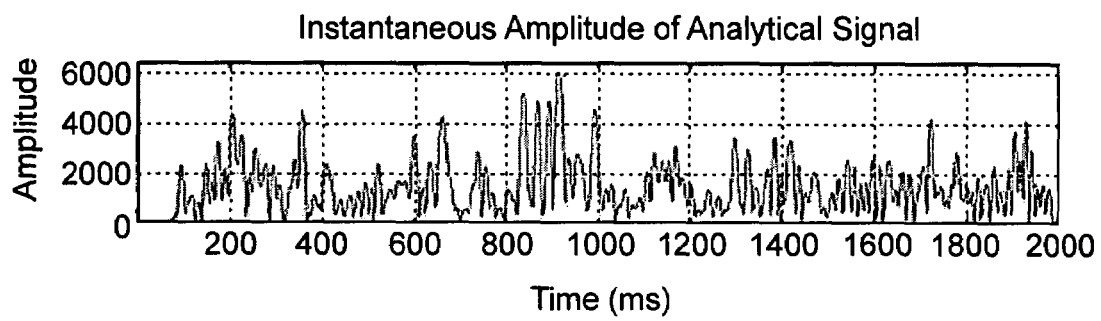
Figure 1C:
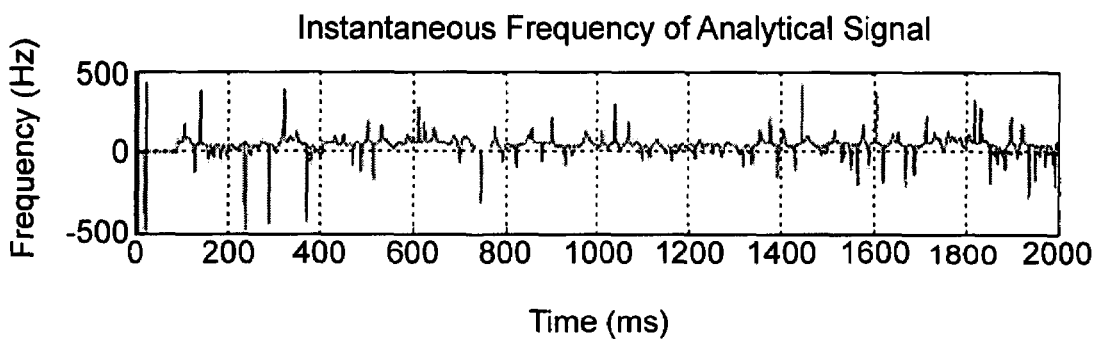
Figure 2A:
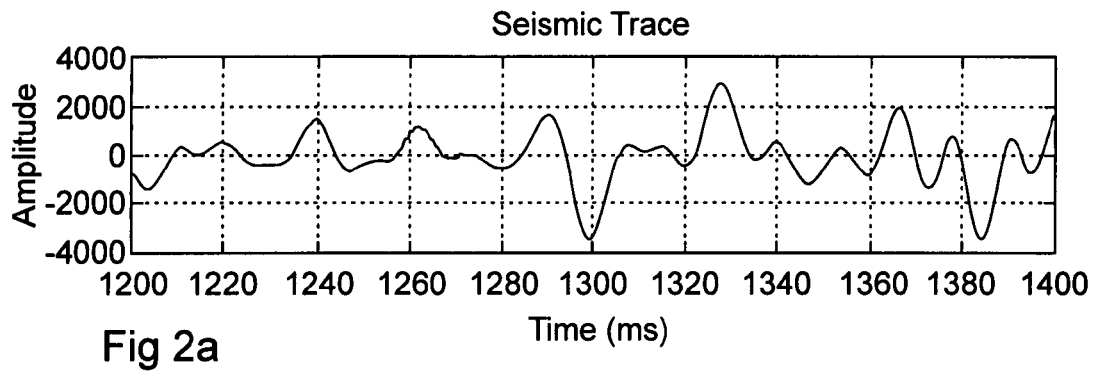
FIGS. 2a to 2c are diagrams illustrating an enlarged view of a section of the diagrams shown in FIGS. 1a to 1c.
Figure 2B:
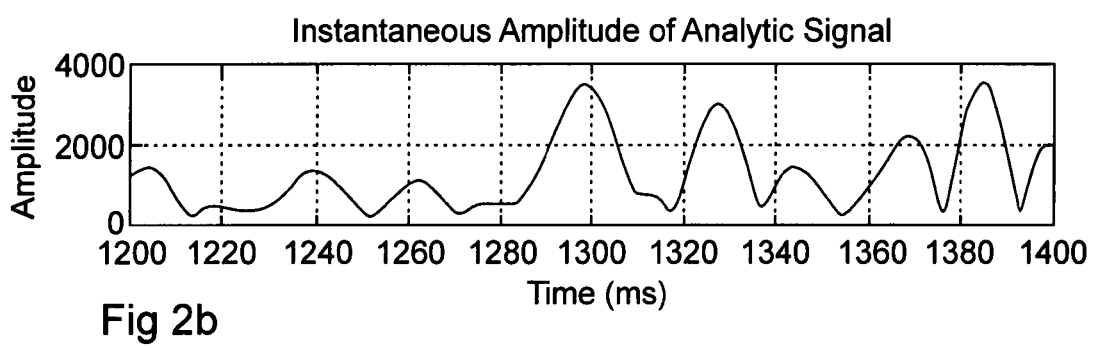
Figure 2C:
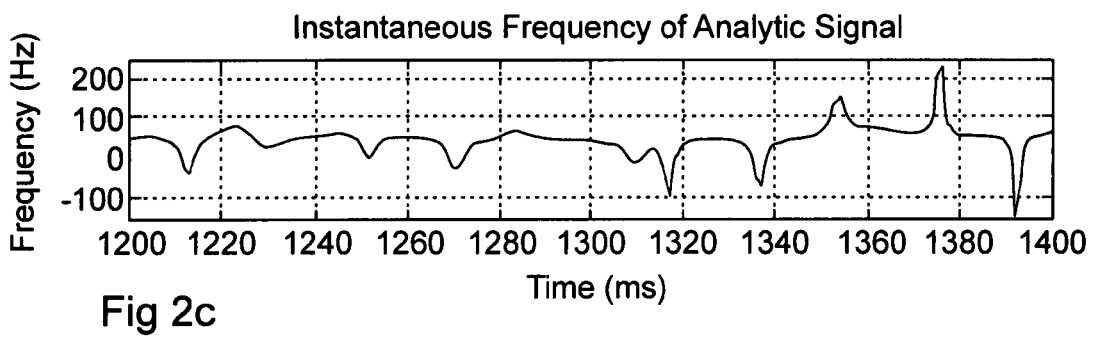

This assumption is true for many signals, and, therefore, the analytic signal is still widely used for determining the instantaneous amplitude and the instantaneous frequency. However, although the instantaneous amplitude A[t] and the instantaneous phase φ[t] are always defined, they are not always physically meaningful. In particular, the analytic signal fails for signals having multiple extrema between a same pair of zero crossings, as shown in FIGS. 1a and 2a. For this type of signal, if the instantaneous amplitude A[t] is to remain positive, as shown in FIGS. 1b and 2b, the instantaneous phase φ[t] is not able to increase monotonically, causing the instantaneous frequency F[t] to become negative and to experience large "spikes", as shown in FIGS. 1c and 2c. This type of behavior is found in signals that contain events that overlap in time but have different frequencies. For such signals, which are frequently encountered in exploration seismology, it is not possible to define a single instantaneous frequency in a meaningful way.

Figure 3:
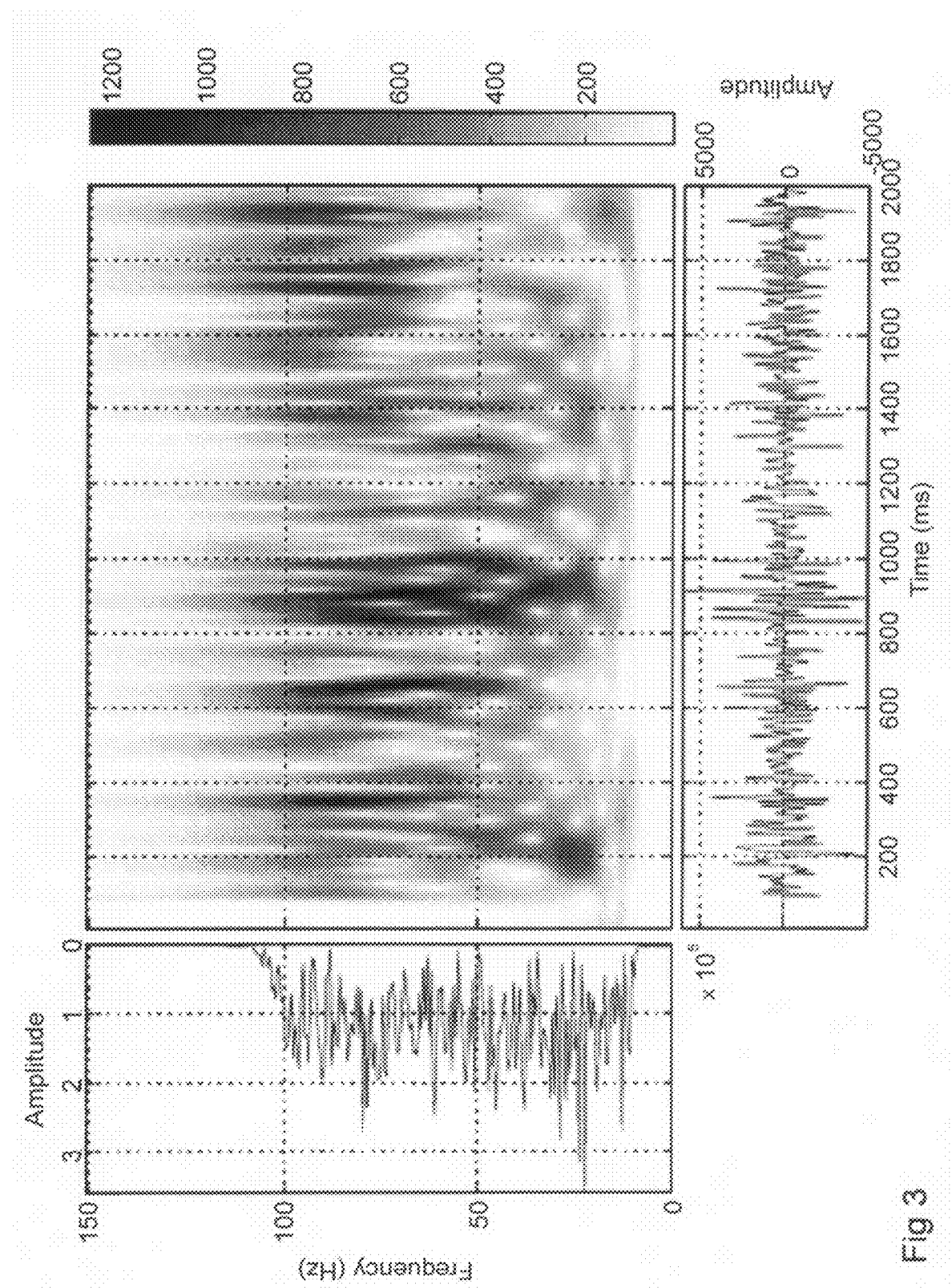
FIG. 3 is a diagram illustrating the S-transform—large sub-diagram—of a seismic trace—bottom sub-diagram—and, for comparison, the DFT—left hand side sub-diagram—of the seismic trace.

The DFT is poorly suited for describing signals whose frequency content changes with time since it has no time resolution. For such signals a time-frequency transform such as the Stockwell or S-transform is better suited which is defined as:

$$S[t, f] = \sum_{\tau=0}^{N-1} h[\tau]\left\{\frac{|f|}{\sqrt{2\pi}\,N}\exp\left(\frac{-f^2(t-\tau)^2}{2N^2}\right)\right\}\exp\left(\frac{-2\pi i f\tau}{N}\right), \quad (10)$$

where τ has units of time. Here, the term in braces is a Gaussian window that localizes a complex sinusoid in time, permitting the calculation of local spectra compared to a global spectrum of the DFT. The S-transform is a function of both time and frequency. FIG. 3 shows the modulus of the S-transform |S[t,f]|—large sub-diagram—of a seismic trace h[t]—bottom sub-diagram—and, for comparison, the DFT H[f]—left hand side sub-diagram—of the seismic trace h[t].

Figure 4:
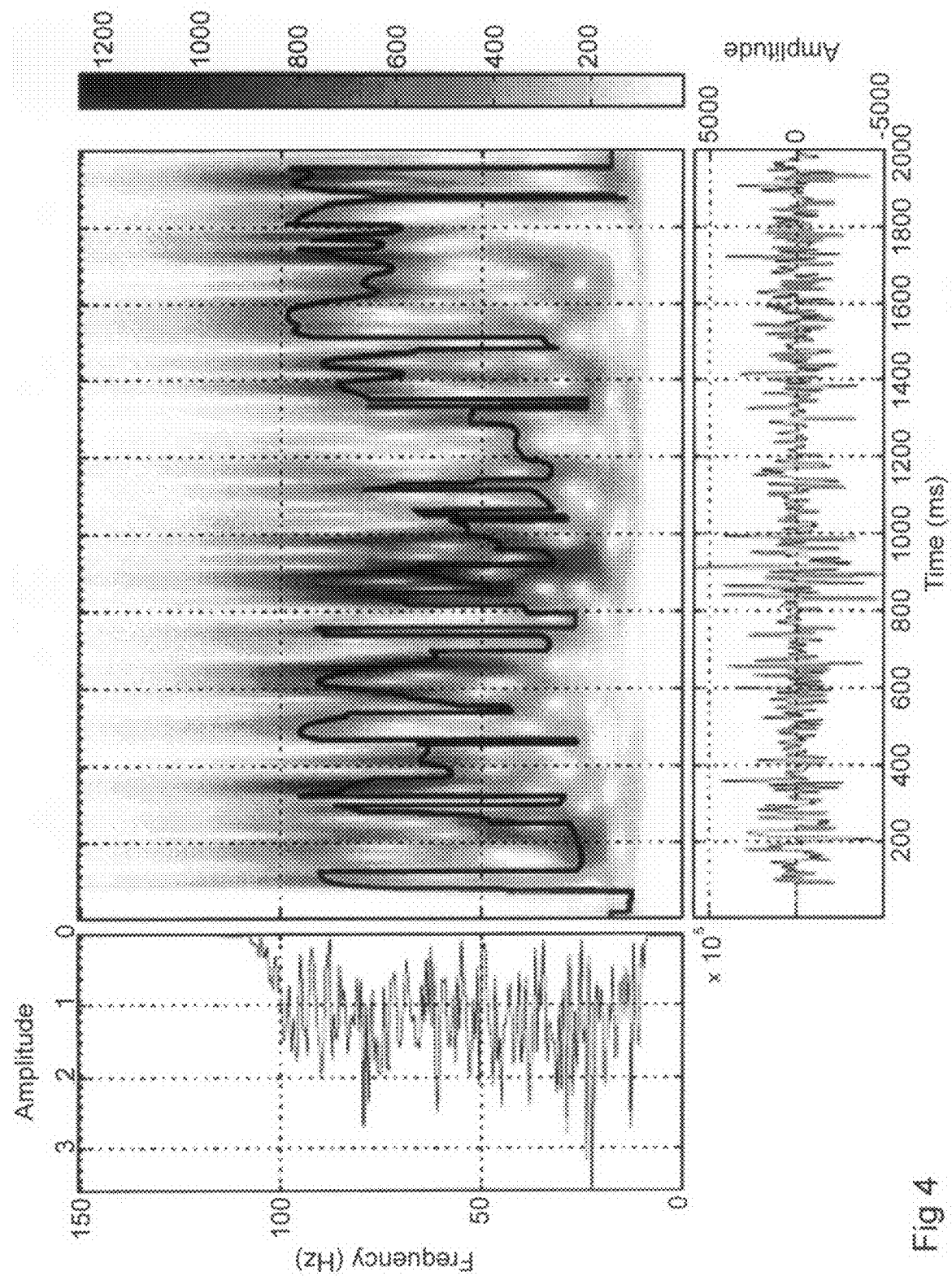
FIG. 4 is the diagram shown in FIG. 3 with the dominant instantaneous frequency superimposed.

In a method for processing seismic data according to the invention the S-transform is employed to provide an alternative to equation (2) for defining the instantaneous amplitude and the instantaneous frequency. At predetermined time instances t, for example, at time instances where the seismic trace h[t] has been sampled, the instantaneous amplitude A[t] is defined to be the maximum value of the modulus of the S-transform |S[t,f]| over all frequency values f, and the instantaneous frequency F[t] is defined to be the frequency at which the maximum occurs. Using this definition, F[t] and A[t] represent the dominant instantaneous frequency and its amplitude at a given time instance t, omitting smaller peaks. FIG. 4 shows the data of FIG. 3 with the dominant instantaneous frequency F[t]—solid line—superimposed over the modulus of the S-transform |S[t,f]|. The instantaneous amplitude A[t] of a respective dominant instantaneous frequency F[t] at a time instance t is given by the grey scale value of the modulus of the S-transform |S[t,f]| at the superimposed dominant instantaneous frequency F[t]. From FIG. 4 is clearly visible that the dominant instantaneous frequency F[t] undergoes large variations as events reach their maximum amplitude on the time-frequency plane and then decay followed by other events having different peak frequencies. As will be shown below, this feature is highly beneficial for the detection of hydrocarbon deposits.

The definition of the sweetness factor:

$$SF[t] = \frac{A[t]}{F[t]} \quad (11)$$

is based on the experience that seismic waves propagating through the ground are strongly reflected from the top of a hydrocarbon bearing layer resulting in a high instantaneous amplitude A[t]; and that after the strong reflection, the part of the seismic wave that is transmitted into the hydrocarbon bearing layer experiences attenuation of its high frequencies due to the low Q factor of this layer, lowering the instantaneous frequency F[t] and thereby increasing the quotient A[t]/F[t], or at least extending the time period over which the quotient A[t]/F[t] is high, compared with the instantaneous amplitude A[t] alone.

Figure 5:
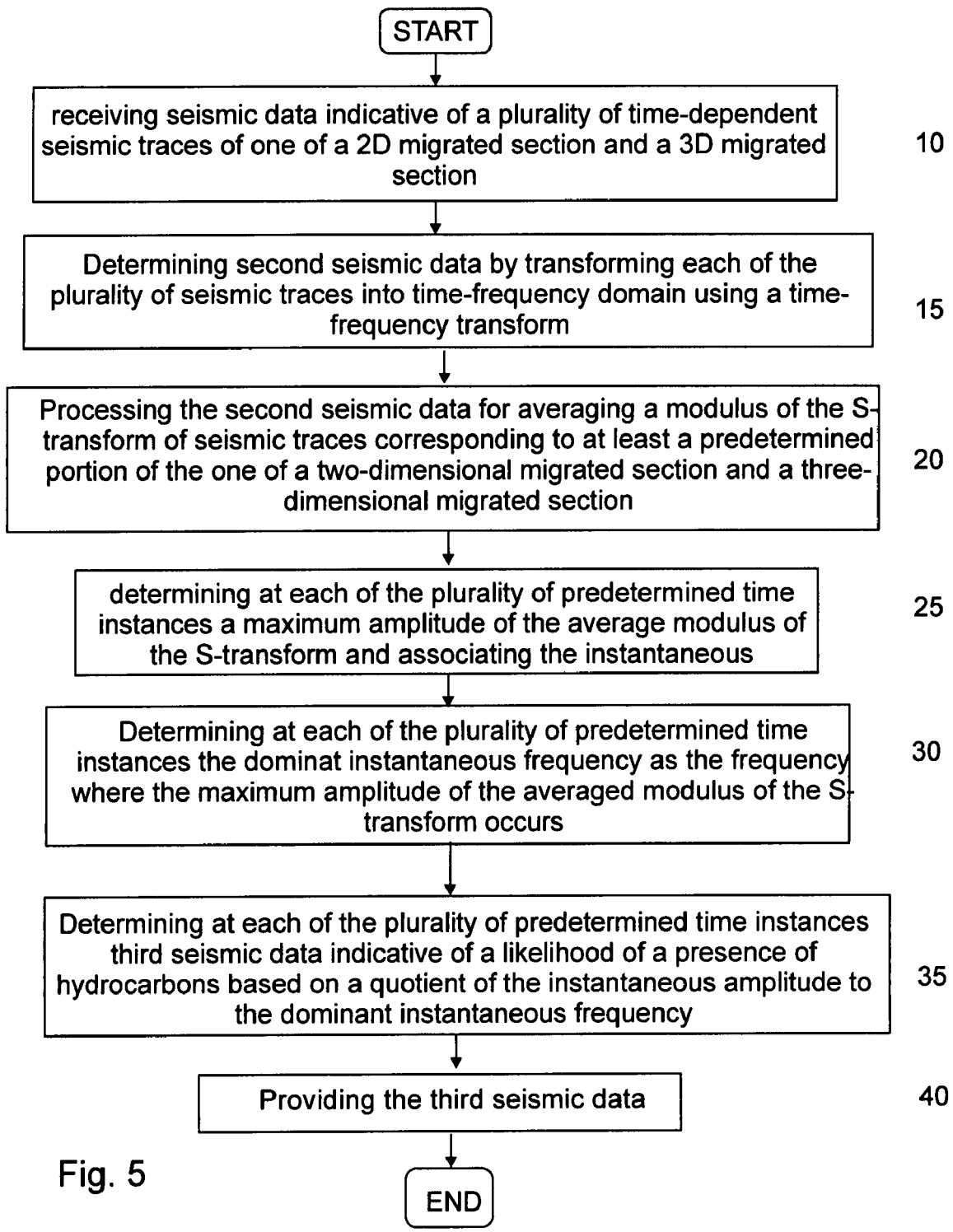
FIG. 5 is a simplified flow diagram illustrating a first embodiment of a method for processing seismic data according to the invention.

Referring to FIG. 5, a simplified flow diagram of a first embodiment of a method for processing seismic data according to the invention is shown. The seismic data received for processing—box 10—comprise, for example, a plurality of time-dependent seismic traces of one of a 2D migrated section and a 3D migrated section obtained in exploration seismology for detecting hydrocarbon deposits. The seismic data of migrated sections are space- and time-dependent with space coordinates indicating the position of a time-dependent seismic trace on the ground surface along a line—2D migrated section—or in an area—3D migrated section. Each of the plurality of seismic traces is then transformed into time-frequency domain using a time-frequency transform providing second seismic data—box 15. The transformation is performed using, for example, the S-transform as outlined above. Alternatively, a different transformation is employed such as S-transform, Gabor transform, Curvelet transform, Contourlet transform, Ridgelet transform, or Beamlet transform. After transformation, the second seismic data are processed for averaging a modulus of the S-transform of seismic traces corresponding to at least a predetermined portion of the migrated section—box 20. This step is optional, but by averaging of the modulus of the S-transform of different seismic traces provides improved "overall" results. The portion is predetermined, for example, in dependence upon the received seismic data and the size of a region of interest. Preferably, the portion is determined through user interaction during processing of the seismic data, as will be discussed below. Referring to box 25, at each of a plurality of predetermined time instances, for example, at time instances where the seismic trace has been sampled, a maximum amplitude of the averaged modulus of the S-transform is determined and the instantaneous amplitude is associated therewith. Alternatively, if the previous step of averaging has been omitted a maximum amplitude of the modulus of the S-transform of each seismic trace is determined. At each of the plurality of predetermined time instances the dominant instantaneous frequency is then determined as the frequency where the maximum amplitude occurs—box 30. Having determined the instantaneous amplitude and the dominant instantaneous frequency, third seismic data are determined—box 35—based on a quotient of the instantaneous amplitude to the dominant instantaneous frequency—sweetness factor. The third seismic data are indicative of a likelihood of a presence of hydrocarbons, as will be explained below. Finally, the third seismic data are provided—box 40—for storage, further processing, or display. For example, plotting data are determined from the seismic data, the second seismic data, the instantaneous amplitude, the dominant instantaneous frequency, and, of course, the third seismic data. Preferably, using a graphical display, the plotting data are displayed enabling a user to interpret the data. Further preferably, user interaction is enabled in order to control the data processing such as, for example, selecting seismic traces for processing or regions of interest for averaging.

The following Figures illustrate examples of processed seismic traces using the above method for processing seismic data according to the invention.

Figure 6:
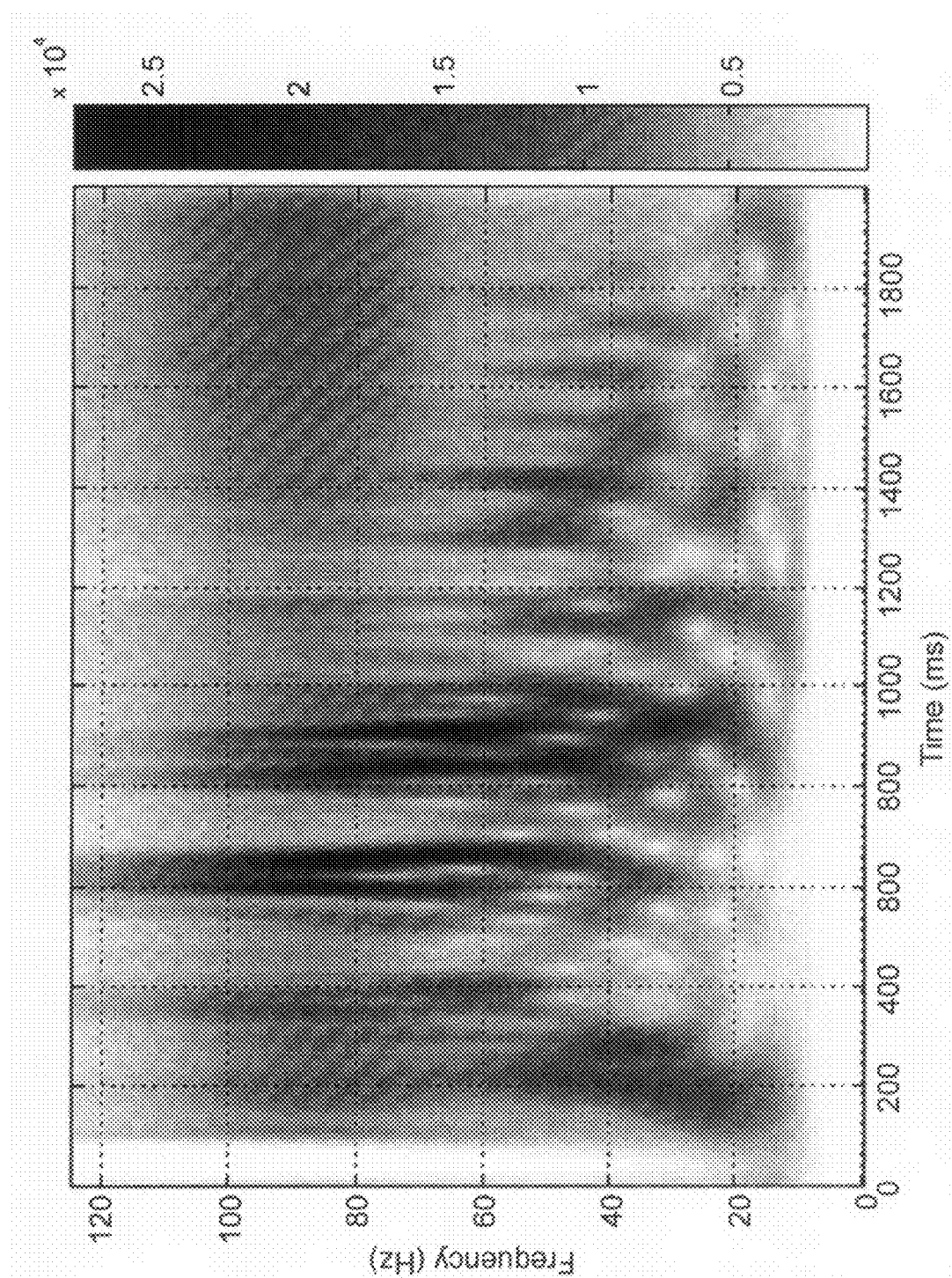
FIG. 6 is a diagram illustrating the average of the modulus of the S-transform of 2500 seismic traces obtained in a region having a hydrocarbon bearing layer beneath.

FIG. 6 shows the average of the modulus of the S-transform of 2500 seismic traces of a 3D migrated section. The seismic traces have been obtained in a region having hydrocarbon bearing layer beneath at depths corresponding to approximately 700 to 750 ms on the time axis. A strong reflection at approximately 650 ms is clearly noticeable followed by a lack of high frequencies—approximately 80 Hz—extending over several tens of ms. This lack of high frequencies is due to the low Q factor of the hydrocarbon bearing layer.

Figure 7:
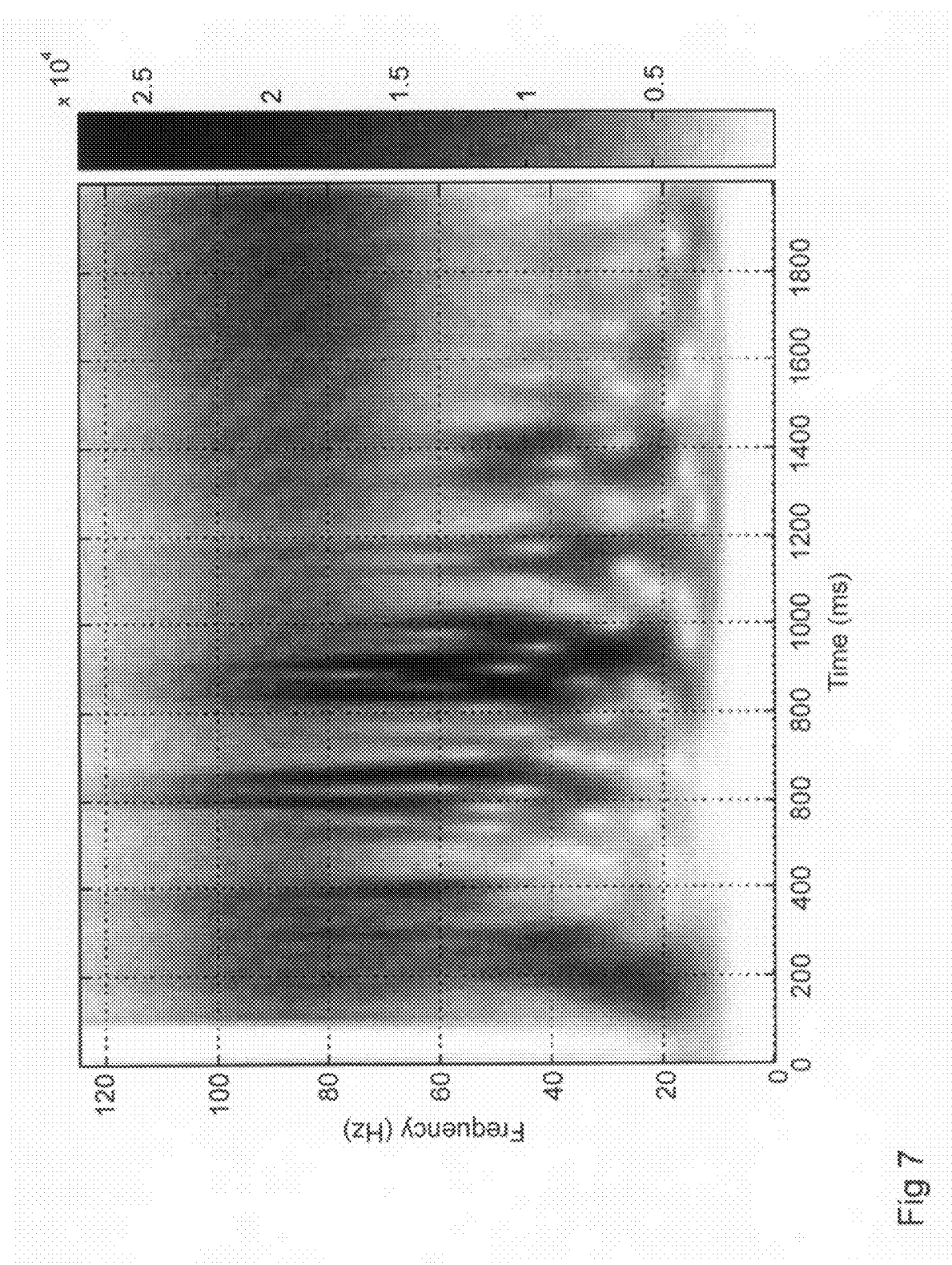
FIG. 7 is a diagram illustrating the average of the modulus of the S-transform of 2500 seismic traces obtained in a region having a non-hydrocarbon bearing layer beneath.

FIG. 7 shows the average of the modulus of the S-transform of 2500 seismic traces of the same 3D migrated section as the one in FIG. 6 above, but this time the seismic traces selected for averaging have been obtained in a region having a non-hydrocarbon bearing layer beneath. A reflection at approximately 650 ms is still visible but is less pronounced as in FIG. 6, as well as the subsequent decrease in high frequency content.

Figure 8A:
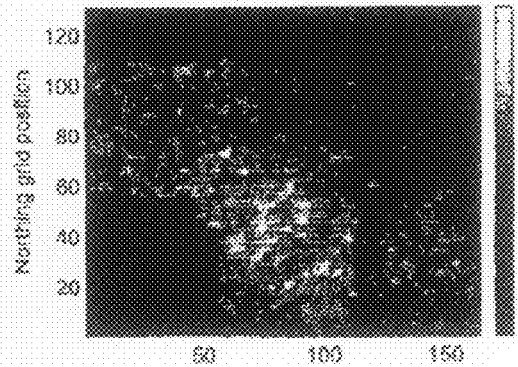
FIGS. 8a to 8d are diagrams illustrating the amplitude of the modulus of the S-transform at 80 HZ over all seismic traces of a 3D migrated section at four different time instances.
Figure 8B:
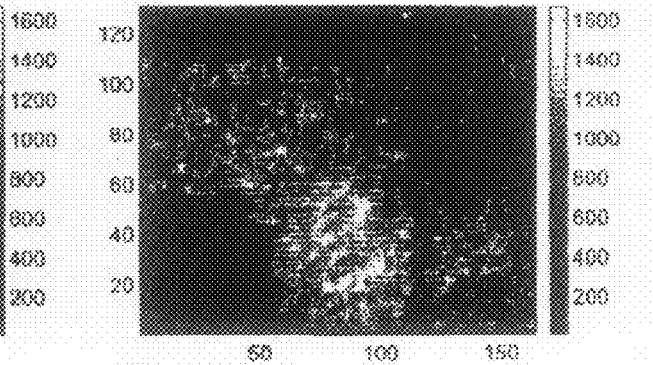
Figure 8C:
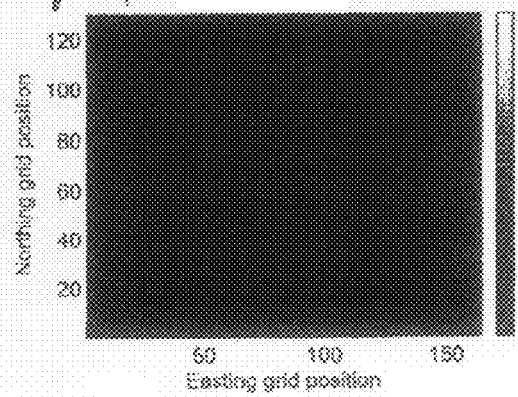
Figure 8D:
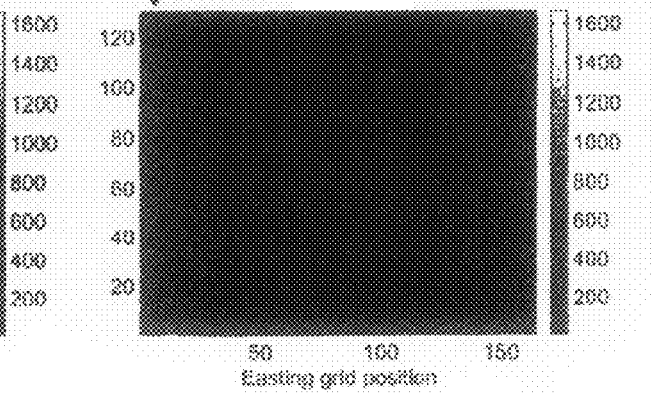

FIGS. 8a to 8d show the amplitude of |S[t,f]| at f=80 Hz—near the high frequency limit for exploration seismic data—over all seismic traces of the 3D migrated section at four different time instances. FIGS. 8a and 8b show the large amplitude reflection at 650 ms and 660 ms, respectively, which is most pronounced in the south central portion of the data region—the region of interest. FIGS. 8c and 8d show the amplitude at 700 ms and 720 ms, respectively. The presence of hydrocarbons leads to a strong decrease in the amplitude of the 80 Hz frequency in the region of interest. It is possible that larger amplitudes occur at lower frequencies, i.e. it is still possible that the instantaneous amplitude is still high in the region of interest, but the dominant instantaneous frequency F[t] is substantially less likely to be high in the region of interest, compared with surrounding regions having no hydrocarbon bearing layer beneath. Thus, in the region of interest the sweetness factor A[t]/F[t] shows two maxima in sequence—or at least an extended time period over which the sweetness factor is high—giving the sweetness factor a typical hydrocarbon signature.

Figure 9:
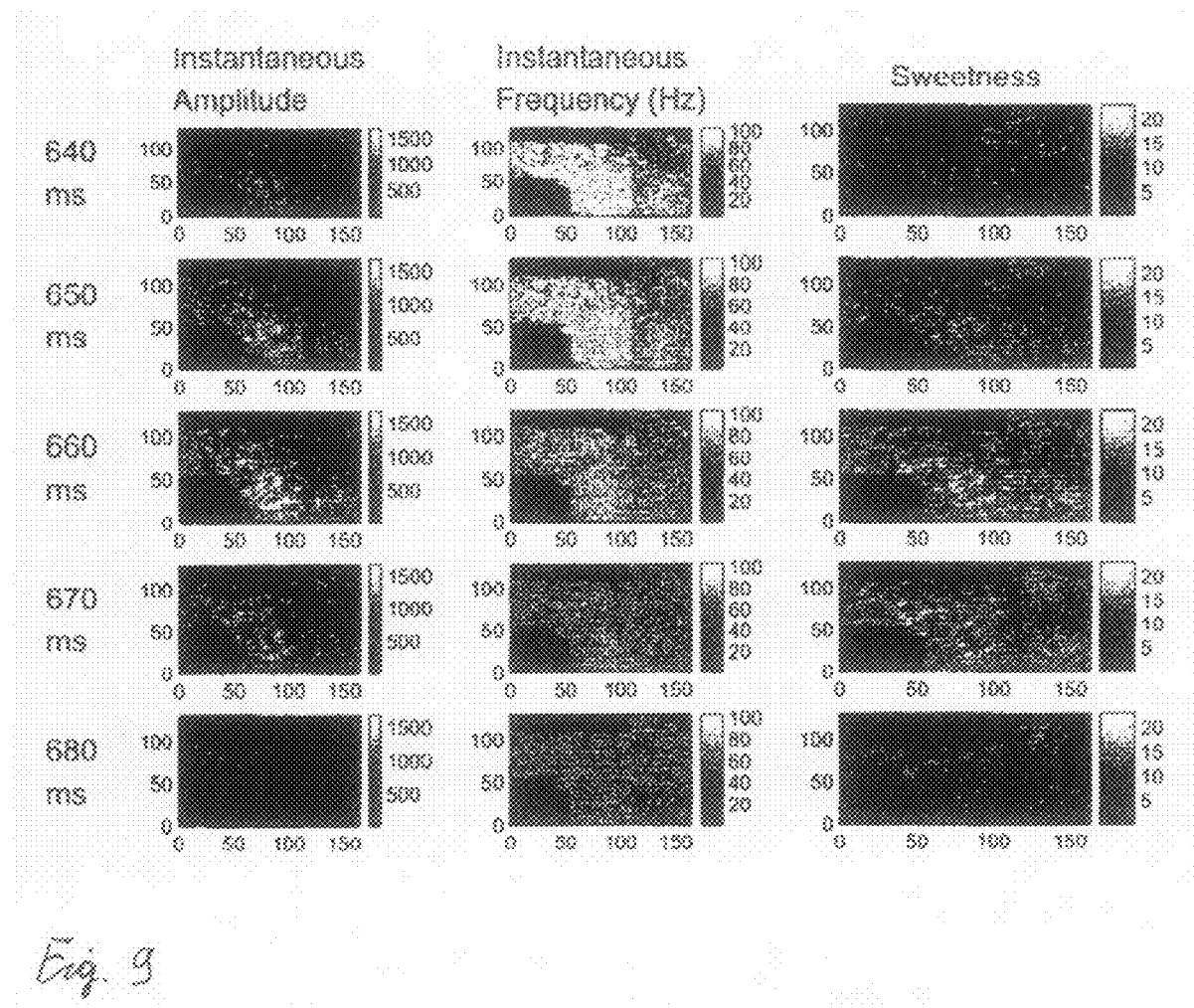
FIGS. 9 to 11 are diagrams illustrating the instantaneous amplitude, the dominant instantaneous frequency, and the sweetness factor at various time instances.
Figure 10:
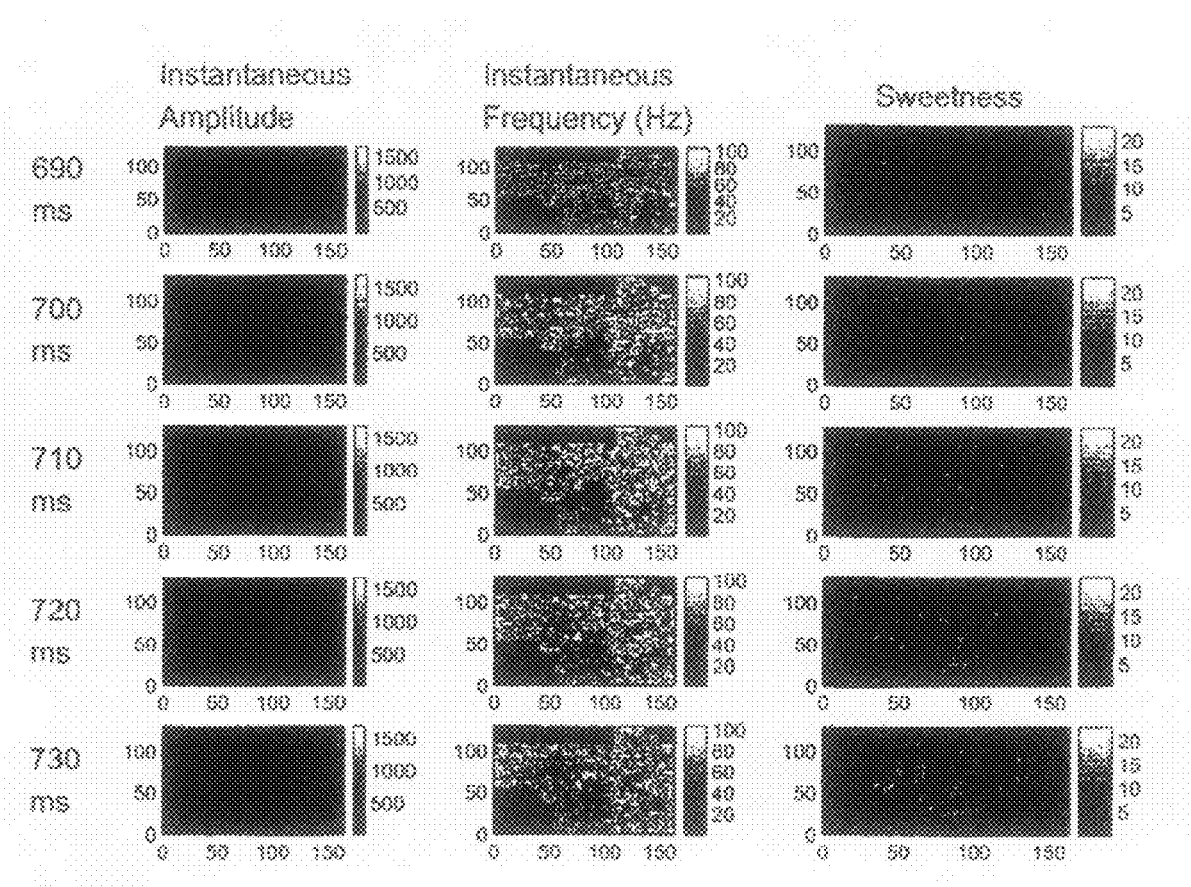
Figure 11:
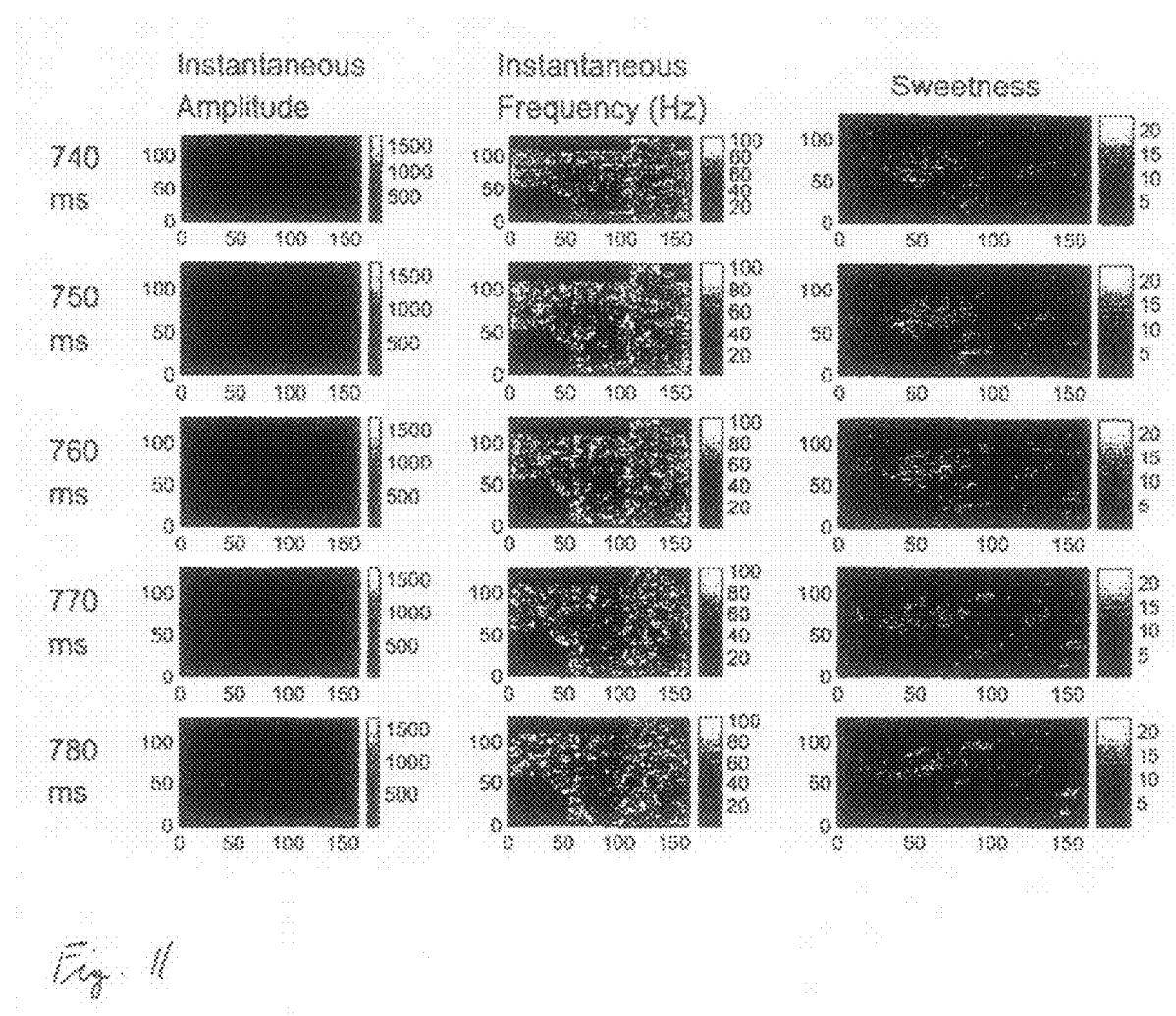

For a 3D migrated section the instantaneous amplitude A[t], the dominant instantaneous frequency F[t], and the sweetness factor SF[t] become A[x,y;t], F[x,y;t], and SF[x,y;t], respectively, where x and y denote the spatial position of each seismic trace. Thus it is possible to plot time slices of these quantities at all x and y positions for a specific time instance t. FIGS. 9, 10, and 11 illustrate such "time slices" for all three quantities from t=640 ms to t=780 ms in steps of 10 ms.

FIG. 9 illustrate five time slices from t=640 ms to t=680 ms showing the reflection from the top of the hydrocarbon bearing layer. The simultaneous rise in instantaneous amplitude and decrease in dominant instantaneous frequency produces a substantially larger contrast between the sweetness factor values at 640 ms and 670 ms than the corresponding contrast between the instantaneous amplitudes at these time instances.

In the subsequent time range from t=690 ms to t=730 ms, shown in FIG. 10, the instantaneous amplitude is unremarkable, but the dominant instantaneous frequency experiences a large drop in the region of interest as time progresses. The dominant instantaneous frequencies F[x,y;t] are uniformly low in the region of interest at these time instances resulting in a large contiguous area of a relatively high sweetness factor SF[x,y;t].

At time instances later than 730 ms, shown in FIG. 11, the region of interest loses its contiguous nature and becomes more dispersed on both the plots of dominant instantaneous frequency and sweetness factor. Thus, as expected, the sweetness factor exhibits a "double peak" in regions where hydrocarbons are present, with the first peak being due to the amplitude reflection from the top of the layer boundary—higher A[x,y;t]—and the second peak being due to the attenuation of high frequencies by the low Q factor of the hydrocarbon bearing layer—higher 1/F[x,y;t].

As illustrated in the above example, using the definition of the sweetness factor based on the dominant instantaneous frequency obtained from a time-frequency transformation is highly beneficial for detecting hydrocarbon deposits using exploration seismology. In particular, the "double peak" hydrocarbon signature of the sweetness factor in the region of interest is substantially clearer revealed than using state of the art methods, allowing substantially easier identification of such regions during interpretation. This feature will be exploited in the following second embodiment of the method for processing seismic data according to the invention.

Figure 12:
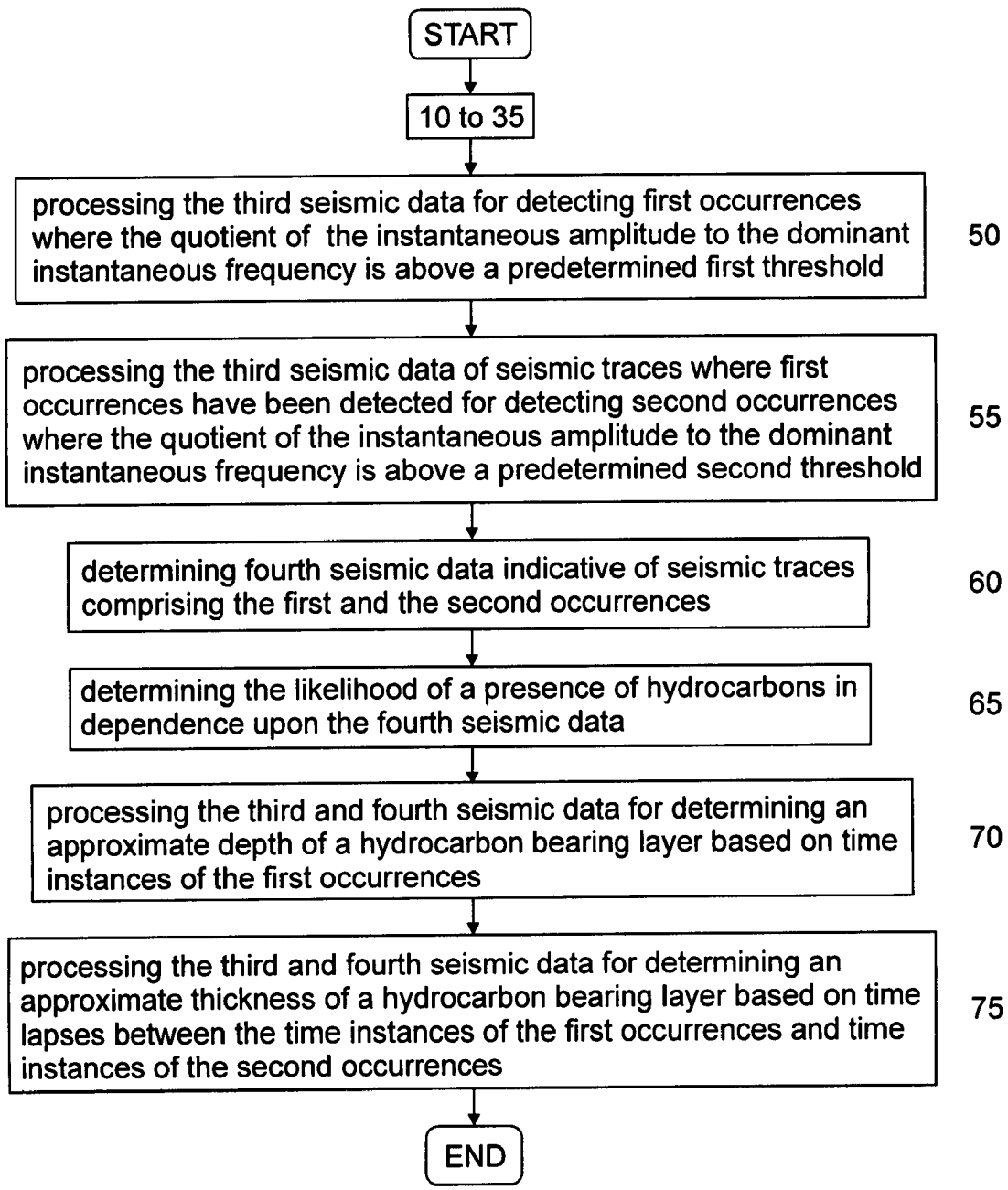
FIG. 12 is a simplified flow diagram illustrating a second embodiment of a method for processing seismic data according to the invention; and, FIG. 13 is a simplified block diagram illustrating a system for processing seismic data using the methods shown in FIGS. 5 and 12 according to the invention.

Referring to FIG. 12, a simplified flow diagram of a second embodiment of a method for processing seismic data according to the invention is shown. For simplicity, same reference numerals are used for same processing steps, i.e. processing steps 10 to 35. Referring to box 50, the third seismic data are processed for detecting first occurrences where the quotient of the instantaneous amplitude to the dominant instantaneous frequency is above a predetermined first threshold. In other words, this step is performed for detecting the first peak of the hydrocarbon signature in the third seismic data. For example, the first threshold is determined depending on a priori information about the geological formation in the explored area, by determining a maximum value of the third seismic data and using a predetermined first portion such as 80% of the same as the first threshold, or through user interaction by viewing the sweetness factor distributions of various time slices in a region, as shown in FIGS. 9 to 11. The third seismic data where first occurrences have been detected are then processed—box 55—for detecting second occurrences where the sweetness factor is above a predetermined second threshold. For example, the second threshold is determined depending on a priori information about the geological formation in the explored area, by determining a maximum value of the third seismic data and using a predetermined second portion such as 20% of the same as the second threshold. Referring to box 60, fourth seismic data are determined which are indicative of seismic traces comprising the first and the second occurrences. The fourth data are then plotted, for example, as an area map showing regions where there is a likelihood of a presence of hydrocarbons and displayed in a human comprehensible fashion. Optionally, the processing steps corresponding to boxes 55 and 60 are performed after averaging over the values of seismic traces in a region comprising first occurrences. In a following processing step—box 65—the likelihood is determined based on the peak values of the sweetness factor at the first and second occurrences. For example, the likelihood is determined for each individual seismic trace or by averaging over the peak values of seismic traces in a region. Referring to box 70, the third and fourth seismic data are processed for determining an approximate depth of the top of a hydrocarbon bearing layer based on the time instances of the first occurrences. In a final step—box 75—the third and fourth seismic data are processed for determining an approximate thickness of a hydrocarbon bearing layer based on time lapses between the time instances of the first occurrences and time instances of the second occurrences. Performing the processing steps corresponding to boxes 50 to 75 using a processor substantially facilitates the evaluation of seismic data. This enables, for example, a computerized pre-evaluation of seismic data or provides substantial assistance during interpretation by a user.

Obviously, the above embodiments of the method for processing seismic data according to the invention are easily implemented in various fashions in order to satisfy specific needs in different applications such as pre-evaluation or detailed interpretation.

Figure 13:
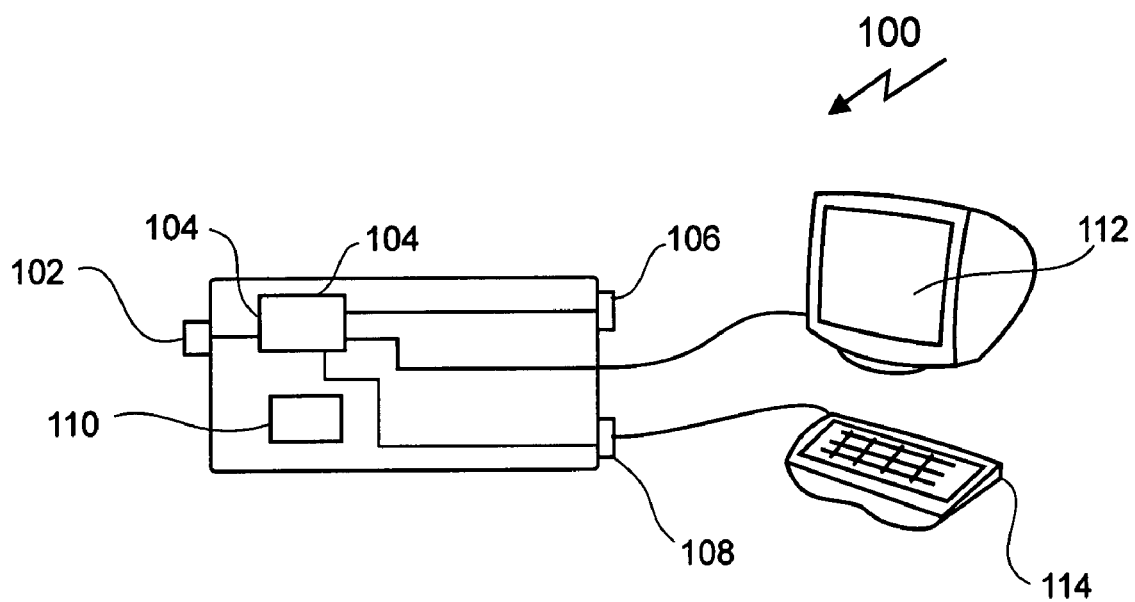

Referring to FIG. 13, a processing system 100 according to the invention for implementing the above processing methods is shown. Seismic signal data are, for example, received at input port 102. Using electronic circuitry such as a processor 104 the signal data are then digitally processed. The system 100 comprises a storage medium 110 having stored therein executable commands for execution on the processor 104 for performing the signal processing corresponding to the above processing methods. Alternatively, the processor 104 comprises electronic circuitry designed for performing at least a portion of the signal processing in a hardware implemented fashion. The system 100 further comprises an output port 106 for providing the processed signal data for storage or further processing. The signal processing is controlled by a user viewing, for example, a human comprehensible graphical representation of the seismic data and data determined during processing on display 112, and by providing control commands via port 108—connected, for example, to a keyboard 114—to the processor 104. Preferably, the display 112 is a graphical user interface facilitating user interaction during signal processing.

Numerous other embodiments of the invention will be apparent to persons skilled in the art without departing from the spirit and scope of the invention as defined in the appended claims.

What is claimed is:

1. A method for processing seismic data comprising:
a processor in communication with the input port for sensing seismic data;
a) receiving the seismic data, the seismic data being indicative of at least a time-dependent seismic trace;
b) determining second seismic data by transforming the seismic data into time-frequency domain using a time-frequency transform;
c) processing the second seismic data for determining at predetermined time instances an instantaneous amplitude and a dominant instantaneous frequency;
d) determining at the predetermined time instances third seismic data indicative of a likelihood of a presence of hydrocarbons based on a quotient of the instantaneous amplitude to the dominant instantaneous frequency; and,
e) providing the third seismic data.

2. A method for processing seismic data as defined in claim 1 wherein c) comprises: determining at each predetermined time instance a maximum amplitude of the modulus of the time-frequency transform and associating the instantaneous amplitude therewith; and,
determining at each predetermined time instance the dominant instantaneous frequency as the frequency where the maximum amplitude of the modulus of the time-frequency transform occurs.

3. A method for processing seismic data as defined in claim 1 wherein the seismic data are transformed using the Stockwell transform.

4. A method for processing seismic data as defined in claim 1 wherein a) the seismic data are received with the seismic data being indicative of a plurality of time-dependent seismic traces of one of a two-dimensional migrated section and a three-dimensional migrated section.

5. A method for processing seismic data as defined in claim 4 wherein b) comprises transforming each of a plurality of seismic traces into time-frequency domain.

6. A method for processing seismic data as defined in claim 5 comprising processing the second seismic data for averaging a modulus of the time-frequency transform of seismic traces corresponding to at least a predetermined portion of the one of a two-dimensional migrated section and a three-dimensional migrated section.

7. A method for processing seismic data as defined in claim 1 comprising determining plotting data for plotting the third seismic data as a function of space and time.

8. A method for processing seismic data as defined in claim 7 comprising displaying the plotting data in a human comprehensible fashion.

9. A method for processing seismic data as defined in claim 8 wherein the plotting data comprise control data for enabling user interaction.

10. A method for processing seismic data as defined in claim 1 comprising:
processing the third seismic data for detecting first occurrences where the quotient of the instantaneous amplitude to the dominant instantaneous frequency is above a predetermined first threshold;
processing the third seismic data of seismic traces where first occurrences have been detected for detecting second occurrences where the quotient of the instantaneous amplitude to the dominant instantaneous frequency is above a predetermined second threshold;
determining fourth seismic data indicative of seismic traces comprising the first and the second occurrences; and,
providing the fourth seismic data.

11. A method for processing seismic data as defined in claim 10 comprising:
determining the likelihood of a presence of hydrocarbons in dependence upon the fourth seismic data.

12. A method for processing seismic data as defined in claim 11 comprising:
processing the third and fourth seismic data for determining an approximate depth of a hydrocarbon bearing layer based on time instances of the first occurrences.

13. A method for processing seismic data as defined in claim 12 comprising:
processing the third and fourth seismic data for determining an approximate thickness of a hydrocarbon bearing layer based on time lapses between the time instances of the first occurrences and time instances of the second occurrences.

14. A method for processing seismic data as defined in claim 10 comprising
determining average amplitudes of the modulus of the time-frequency transform amplitudes of seismic traces corresponding to predetermined portions of the one of a two-dimensional migrated section and a three-dimensional migrated section.

15. A method for processing seismic data comprising:
a processor in communication with the input port for sensing seismic data;
receiving the seismic data, the seismic data being indicative of a plurality of time-dependent seismic traces of one of a two-dimensional migrated section and a three-dimensional migrated section;
determining second seismic data by transforming each of the plurality of seismic traces into time-frequency domain using a Stockwell transform;
processing the second seismic data for averaging a modulus of the S-transform of seismic traces corresponding to at least a predetermined portion of the one of a two-dimensional migrated section and a three-dimensional migrated section;
determining at each of a plurality of predetermined time instances a maximum amplitude of the averaged modulus of the Stockwell transform and associating the instantaneous amplitude therewith;
determining at each of the plurality of predetermined time instances the dominant instantaneous frequency as the frequency where the maximum amplitude of the averaged modulus of the Stockwell transform occurs;
determining at each of the plurality of predetermined time instances third seismic data indicative of a likelihood of a presence of hydrocarbons based on a quotient of the instantaneous amplitude to the dominant instantaneous frequency; and,
providing the third seismic data.

16. A storage medium having stored therein executable commands for execution on a processor, the processor when executing the commands performing:
a) receiving the seismic data, the seismic data being indicative of at least a time-dependent seismic trace;
b) determining second seismic data by transforming the seismic data into time-frequency domain using a time-frequency transform;
c) processing the second seismic data for determining at predetermined time instances an instantaneous amplitude and a dominant instantaneous frequency;
d) determining at the predetermined time instances third seismic data indicative of a likelihood of a presence of hydrocarbons based on a quotient of the instantaneous amplitude to the dominant instantaneous frequency; and,
e) providing the third seismic data.

17. A storage medium as defined in claim 16 having stored therein executable commands for execution on a processor, the processor when executing the commands performing:
determining at each predetermined time instance a maximum amplitude of the modulus of the time-frequency transform and associating the instantaneous amplitude therewith; and,
determining at each predetermined time instance the dominant instantaneous frequency as the frequency where the maximum amplitude of the modulus of the time-frequency transform occurs.

18. A storage medium as defined in claim 16 having stored therein executable commands for execution on a processor, the processor when executing the commands performing:
processing the second seismic data for averaging a modulus of the time-frequency transform of seismic traces corresponding to at least a predetermined portion of one of a two-dimensional migrated section and a three-dimensional migrated section.

19. A storage medium as defined in claim 16 having stored therein executable commands for execution on a processor, the processor when executing the commands performing:
processing the third seismic data for detecting first occurrences where the quotient of the instantaneous amplitude to the dominant instantaneous frequency is above a predetermined first threshold;
processing the third seismic data of seismic traces where first occurrences have been detected for detecting second occurrences where the quotient of the instantaneous amplitude to the dominant instantaneous frequency is above a predetermined second threshold;

determining fourth seismic data indicative of seismic traces comprising the first and the second occurrences; and, providing the fourth seismic data.

20. A storage medium having stored therein executable commands for execution on a processor, the processor when executing the commands performing:

receiving the seismic data, the seismic data being indicative of a plurality of time-dependent seismic traces of one of a two-dimensional migrated section and a three-dimensional migrated section;

determining second seismic data by transforming each of the plurality of seismic traces into time-frequency domain using a Stockwell transform;

processing the second seismic data for averaging a modulus of the Stockwell transform of seismic traces corresponding to at least a predetermined portion of the one of a two-dimensional migrated section and a three-dimensional migrated section;

determining at each of a plurality of predetermined time instances a maximum amplitude of the averaged modulus of the Stockwell transform and associating the instantaneous amplitude therewith;

determining at each of the plurality of predetermined time instances the dominant instantaneous frequency as the frequency where the maximum amplitude of the averaged modulus of the Stockwell transform occurs;

determining at each of the plurality of predetermined time instances third seismic data indicative of a likelihood of a presence of hydrocarbons based on a quotient of the instantaneous amplitude to the dominant instantaneous frequency; and, providing the third seismic data.

21. A system for processing seismic data comprising:

an input port for receiving the seismic data, the seismic data being indicative of at least a time-dependent seismic trace;

a processor in communication with the input port for:
a) determining second seismic data by transforming the seismic data into time-frequency domain using a time-frequency transform;
b) processing the second seismic data for determining at predetermined time instances an instantaneous amplitude and a dominant instantaneous frequency;
c) determining at the predetermined time instances third seismic data indicative of a likelihood of a presence of hydrocarbons based on a quotient of the instantaneous amplitude to the dominant instantaneous frequency; and, a storage medium in communication with the processor having stored therein executable commands for execution on the processor, the processor when executing the commands performing at least a portion of a) to c); and, an output port in communication with the processor for providing the third seismic data.

22. A system for processing seismic data as defined in claim 21 wherein the processor comprises electronic circuitry designed for performing at least a portion of a) to c).

23. A system for processing seismic data as defined in claim 21 comprising a control port in communication with the processor for receiving control commands for controlling at least a portion of a) to c).

24. A system for processing seismic data as defined in claim 23 comprising a graphical display in communication with the processor for displaying at least one of the seismic data, the second seismic data and the third seismic data in a human comprehensible fashion.

25. A system for processing seismic data as defined in claim 24 wherein the graphical display comprises a graphical user interface.

26. A system for processing seismic data comprising:

an input port for receiving the seismic data, the seismic data being indicative of a plurality of time-dependent seismic traces of one of a two-dimensional migrated section and a three-dimensional migrated section;

a processor in communication with the input port for:
a) determining second seismic data by transforming each of the plurality of seismic traces into time-frequency domain using a stockwell-transform;
b) processing the second seismic data for averaging a modulus of the S-transform of seismic traces corresponding to at least a predetermined portion of the one of a two-dimensional migrated section and a three-dimensional migrated section;
c) determining at each of a plurality of predetermined time instances a maximum amplitude of the averaged modulus of the stockwell-transform and associating the instantaneous amplitude therewith;
d) determining at each of the plurality of predetermined time instances the dominant instantaneous frequency as the frequency where the maximum amplitude of the averaged modulus of the stockwell-transform occurs;
e) determining at each of the plurality of predetermined time instances third seismic data indicative of a likelihood of a presence of hydrocarbons based on a quotient of the instantaneous amplitude to the dominant instantaneous frequency; and, a storage medium in communication with the processor having stored therein executable commands for execution on the processor, the processor when executing the commands performing at least a portion of a) to e); and, an output port in communication with the processor for providing the third seismic data.

* * * * *